US011316166B2

(12) United States Patent
Bucur et al.

(10) Patent No.: US 11,316,166 B2
(45) Date of Patent: Apr. 26, 2022

(54) FUNCTIONALIZATION OF CARBON FOR EMBEDDING IN CHALCOGEN PARTICLES TO ENHANCE ELECTRONIC CONDUCTIVITY (71) Applicant: Toyota Motor Engineering & Manufacturing North America, Inc., Erlanger, KY (US)

(72) Inventors: Claudiu B. Bucur, Ypsilanti, MI (US); Naoki Osada, Northville, MI (US); John Muldoon, Saline, MI (US); Mike Jones, Orchard Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 465 days.

(21) Appl. No.: 14/985,170

(22) Filed: Dec. 30, 2015

(65) Prior Publication Data
US 2017/0194648 A1 Jul. 6, 2017

(51) Int. Cl.
*H01M 4/62* (2006.01)
*H01M 4/36* (2006.01)
*H01M 4/38* (2006.01)
*H01M 4/136* (2010.01)
*C23C 22/05* (2006.01)

(52) U.S. Cl.
CPC ............ *H01M 4/625* (2013.01); *C23C 22/05* (2013.01); *H01M 4/136* (2013.01); *H01M 4/366* (2013.01); *H01M 4/38* (2013.01); *H01M 2220/20* (2013.01)

(58) Field of Classification Search
CPC ........ H01M 4/625; H01M 4/38; H01M 4/366; H01M 4/602; H01M 2220/20; H01M 2004/028
See application file for complete search history.

(56) References Cited

U.S. PATENT DOCUMENTS

| 6,331,586 B1 * | 12/2001 | Thielen | C08L 23/06 524/401 |
| 2002/0014184 A1 * | 2/2002 | Yeh | C09B 67/0001 106/472 |
| 2002/0160251 A1 * | 10/2002 | Chang | H01M 4/366 429/528 |

(Continued)

FOREIGN PATENT DOCUMENTS

| CN | 102097622 | * | 6/2011 | .......... H01M 10/052 |
| CN | 102903887 | * | 1/2013 | .............. H01M 4/13 |

(Continued)

OTHER PUBLICATIONS

Yang et al. (ACS Nano vol 5, No. 11, pp. 1987-9193 2011).*

(Continued)

*Primary Examiner* — Cynthia H Kelly
*Assistant Examiner* — Aaron J Greso
(74) *Attorney, Agent, or Firm* — Oblon, McClelland, Maier & Neustadt, L.L.P.

(57) ABSTRACT

A particle having a core of elemental chalcogen elements, such as sulfur, selenium and tellurium, and a coating of at least one polymeric layer on the core. A functionalized conductive carbon material is dispersed in the core. A cathode containing the particles and a battery constructed with the cathode are also provided.

18 Claims, 9 Drawing Sheets

(56) References Cited

U.S. PATENT DOCUMENTS

| | | | | |
|---|---|---|---|---|
| 2013/0164625 A1* | 6/2013 | Manthiram | ............. | H01M 4/13 |
| | | | | 429/231.8 |
| 2013/0224594 A1* | 8/2013 | Yushin | .................... | H01M 4/38 |
| | | | | 429/218.1 |
| 2014/0234707 A1* | 8/2014 | Muldoon | ............. | H01M 4/622 |
| | | | | 429/211 |
| 2014/0335419 A1* | 11/2014 | Kawasaki | ............... | C01B 25/45 |
| | | | | 429/231.8 |
| 2015/0155549 A1* | 6/2015 | Moganty | ............... | H01M 4/364 |
| | | | | 429/213 |

FOREIGN PATENT DOCUMENTS

| | | | | | |
|---|---|---|---|---|---|
| JP | S58-222157 | * | 6/1982 | ............... | C09C 1/00 |
| WO | WO 2013/073561 | * | 5/2013 | ............... | H01M 4/58 |

OTHER PUBLICATIONS

CN 102097622 ESPACENET Abstract and English Machine Translation Jun. 5, 2011.*

Lion Specialty Chemicals Product Publiscation, Ketjenblack electroconductive surface area 1270 BET {https://www.lion-specialty-chem.co.jp/en/product/carbon/carbon01.htm} (C) 1996—considered published Dec. 1996.*

Sigma Aldrich Product (Google) Search, poly(acrylic acid), Mw=100,000 "Sigma Aldrich" Sep. 2014 see Very Large URL address source on enclosed document.*

* cited by examiner

200
FUNCTIONALIZATION OF CARBON FOR EMBEDDING IN CHALCOGEN PARTICLES TO ENHANCE ELECTRONIC CONDUCTIVITY

BACKGROUND

Field of the Disclosure

This disclosure is directed to polymer-coated chalcogen particles embedded with functionalized conductive carbon material. These particles are suitable for utility as an electrode active material. This disclosure is also directed to a cathode containing the polymer-coated chalcogen particles embedded with functionalized carbon material and an electrochemical cell or battery containing the cathode.

Discussion of the Background

Future electric vehicles and portable electronics will demand the advent of batteries with higher energy densities than what is currently offered by lithium ion. The goal in battery research is to couple a metal anode, such as lithium or magnesium, with a high capacity conversion cathode, such as sulfur or oxygen, without sacrificing cycle life and rate capability. While sulfur is economical, highly abundant and its charge capacity is an order of magnitude higher than insertion lithium ion cathodes, it is electrically insulating and it suffers from mass loss during cycling due to reduction intermediates which are highly soluble.

While sulfur has been an attractive cathode for more than 50 years, its viability has been hindered by two fundamental challenges which need to be resolved. The first challenge is to enhance the conductivity of elemental sulfur. Unlike commercial lithium ion cathodes ($LiCoO_2$) which possess a high electronic conductivity and do not require significant addition of conductive additives, sulfur is a good insulator which is 1 billion times less conductive than $LiCoO_2$. The second challenge is to control the diffusion of polysulfide intermediates formed during cycling. During discharge, sulfur reduces in a stepwise manner by forming a series of polysulfide intermediates which are ionic in nature and solvate easily in the electrolyte. This causes mass loss of active material upon cycling. Even today, while approaches mitigate these fundamental challenges of low conductivity and dissolution of polysulfides, they also diminish the superior charge capacity of sulfur. One problem deriving from the insulating nature of sulfur is the need for high loadings of conductive additives to improve the overall electronic conductivity. This results in low sulfur content in the cathode. A second problem is the slow rate of operation due to the low electronic conductivity of sulfur and the low ionic conductivity of the reduced product, $Li_2S$. Third, the diffusion of ionic polysulfides limits cycle life due to anode passivation and mass loss from the cathode.

In order to provide batteries having significantly increased energy density, high capacity cathode materials are necessary.

Thus, an object of the present disclosure is to provide a particle which comprises chalcogens and is suitable for utility as an electrode active material.

A second object of the disclosure is to provide a cathode containing the particle as an active material which is suitable for utility in a battery having high capacity and high cycle lifetime.

A third object of the disclosure is to provide a battery which have sufficient capacity and lifetime to be a viable energy source for a vehicle.

SUMMARY OF THE DISCLOSURE

The above and other objects have been achieved by the present disclosure, the first embodiment of which includes a particle, comprising a core comprising at least one element sulfur, selenium and tellurium, and a coating of at least one polymeric layer on the core, where the core comprises a functionalized conductive carbon material.

In selected embodiments, an amount of functionalized conductive carbon material ranges from 1.0 to 15% by weight of a total weight of the core.

In particular embodiments, the functionalized conductive carbon material comprises carboxyl groups on at least a surface of the functionalized conductive carbon material.

In selected embodiments, the functionalized conductive carbon material takes the form of a particle with a particle size ranging from 25 nm to 500 nm.

In most embodiments, the functionalized conductive carbon material is homogeneously dispersed within the core.

The present disclosure provides a method to prepare the particles of any embodiments comprising: (i) mixing an aqueous solution of a polymer with an aqueous solution of a soluble precursor of at least one element selected from the group consisting of sulfur, selenium and tellurium to form a first mixture, (ii) mixing an acid with functionalized conductive carbon material to form a second mixture, and (iii) adding the second mixture to the first mixture to obtain the particles.

In another preferred embodiment, the present disclosure provides a cathode comprising the particles of any of the embodiments according to the present disclosure as an active material and in a further preferred embodiment, the present disclosure includes a battery comprising the cathode.

The present disclosure includes a vehicle containing the battery according to the embodiments of the disclosure.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. According to the present disclosure, the term "chalcogen core" refers to a core containing at least one of elemental sulfur, elemental selenium and elemental tellurium. As used herein, the term "vehicle" refers to any power driven device designed for transportation including an automobile, truck van, bus, golf cart and other utility forms of transportation.

Extensive research efforts have been devoted to developing methods to enhance the conductivity of elemental sulfur and to control the diffusion of polysulfide intermediates formed during cycling. Researchers have studied conductive hosts infused with sulfur and polymer-coated sulfur composites. Since the pioneering findings by Nazar who demonstrated the benefit of infusing sulfur into ordered mesoporous carbon, various micro/nano carbon hosts including spheres, nanofibers, graphene oxide and carbon paper, have been investigated as conductive hosts to contain the sulfur active material (Nazar et al. Nature Materials, 2009, 8, 500-506). Manthiram has recently demonstrated a microporous carbon interlayer with pore sizes matching the dimensions of the polysulfide ions (Manthiram et al. Nature Communications, 2012, 3, 1166). Tarascon infused sulfur into metal organic frameworks (MOF) with hopes of benefitting from interactions between the polysulfides and the MOF oxide surface (Tarascon et al. Journal of the American Chemical Society, 2011, 133, 16154-16160). While these approaches improve the conductivity of the sulfur cathode, they are still plagued by diffusion of polysulfides out of the host pores which limits cycle life. In 2012, Amine obtained a $SeS_2$ carbon nanotube composite starting from commercially available $SeS_2$ delivering 512 mAh/g at 50 mA/g after 30 cycles (Amine et al. Journal of the American Chemical Society, 2012, 134, 4505-4508). Various composites of $SeS_y$ (y=2 or 7) carbon nanotube composites have been prepared and evaluated. The discharged capacities varied from 571 to 833 mAh/g at 50 mA/g after 50 cycles. In addition, Li et al. have explored the preparation of Se/S composites infused into porous carbon which delivers capacities of 910 mAh/g at 1 A/g over 500 cycles (Li et al. Energy and Environmental Science, 2015, 8, 3181-3186). However, the major disadvantage of these approaches is they require a carbon matrix which does not add any capacity to the cathode.

The inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods.

In order to achieve this goal and in view of the technologies described above, the inventors have studied methods to increase the electrical conductivity of cathodic materials. In this effort, the inventors have discovered that the use of carbon hosts conventionally employed can be eliminated and inclusion of a conducting carbon material within the core of chalcogen particles increases the conductivity and leads to significantly improved performance as a cathode active material. In addition, employing chalcogens with higher electrical conductivity than sulfur may also reduce the amount of conducting carbon material that is needed. The electrical conductivities for tellurium, selenium and sulfur are 5 S/cm, $1 \times 10^{-6}$ S/cm and $5 \times 10^{-18}$ S/cm respectively. More importantly, tellurium and selenium, being denser than sulfur, have a volume charge capacity of the same magnitude as sulfur. Therefore, adding selenium and tellurium increases the electrical conductivity of cathodic materials while maintaining, if not improving, their charge capacities.

Thus, the first embodiment of the present disclosure provides a particle, comprising:

a core comprising at least one element selected from the group consisting of sulfur, selenium and tellurium, and a coating of at least one polymeric layer on the core, wherein the core comprises a functionalized conductive carbon material.

The amount of functionalized carbon black material in the particles may range from 1.0 to 15% by weight of a total weight of the core. The amount may preferably be from 1.0 to 10% by weight, more preferably 1.0 to 5 by weight %, and even more preferably from 1.0 to 2.0 by weight %.

In an embodiment of the present disclosure, the functionalized conductive carbon material is dispersed, preferably homogeneously dispersed, in the chalcogen core.

The functionalized conductive carbon material may take on a form of a particle, preferably in a spherical shape. A particle size of functionalized conductive carbon particles may range from 25-500 nm, preferably 15-300 nm, more preferably 15-150 nm. A BET surface area of the functionalized conductive carbon particles may range from 1000-1600 $m^2/g$, preferably 1200-1500 $m^2/g$, more preferably 1350-1500 $m^2/g$.

The functionalized conductive carbon material may be any conductive carbon material which can be functionalized for compatibility with the particle structure and morphology according to the present disclosure. Examples of such materials include carbon black, such as Ketjen black, Super P, Super C65, Ensaco black and acetylene black, and fullerenes.

The functionalized conductive carbon material may contain any functional group that promotes dispersion within the formed chalcogen core. A degree of functionalization in water may be indicated by a Zeta potential. A Zeta potential of the functionalized conductive carbon material may range from −20 mV to −60 mV, preferably −30 mV to −50 mV, more preferably −40 to −50 mV, when measured in distilled water.

Preferably, the functionalized conductive carbon material may comprise carboxyl groups (—COOH) on at least a surface of the functionalized conductive carbon material. A surface acidity of the functionalized conductive carbon material may range from 100 to 600 milliequivalents (meq) per 100 g of functionalized conductive carbon material, preferably 200 to 500 meq/100 g, more preferably 300-450 meq/100 g.

In a preferred embodiment, the functionalized conductive carbon material may be —COOH functionalized Ketjen Black® 600JD.

According to the present disclosure the particles can be generated in situ by precipitation from an aqueous solution of a soluble precursor of at least one element selected from the group consisting of sulfur, selenium and tellurium, and in the presence of the functionalized conductive carbon material and specific polymers which encapsulate the formed particles.

For example, sulfur particles may be formed from the reaction of sodium thiosulfate with an acid, such as hydrochloric acid, as indicated in the following chemical equation (a):

$$Na_2S_2O_3 + 2HCl \rightarrow 2NaCl + SO_2\uparrow + S\downarrow + H_2O \quad (a)$$

Figure 4:
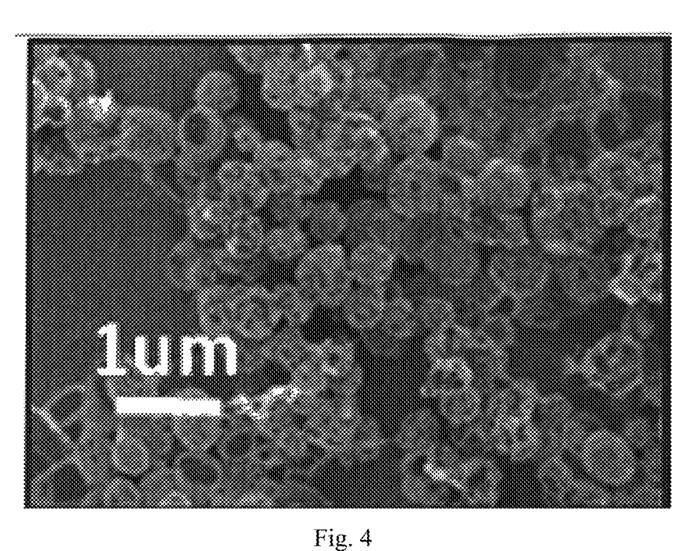
FIG. 4 shows a SEM micrograph of sulfur particles that are embedded with functionalized carbon black particles and prepared with oxalic acid, as shown in the Example.
Figure 5:
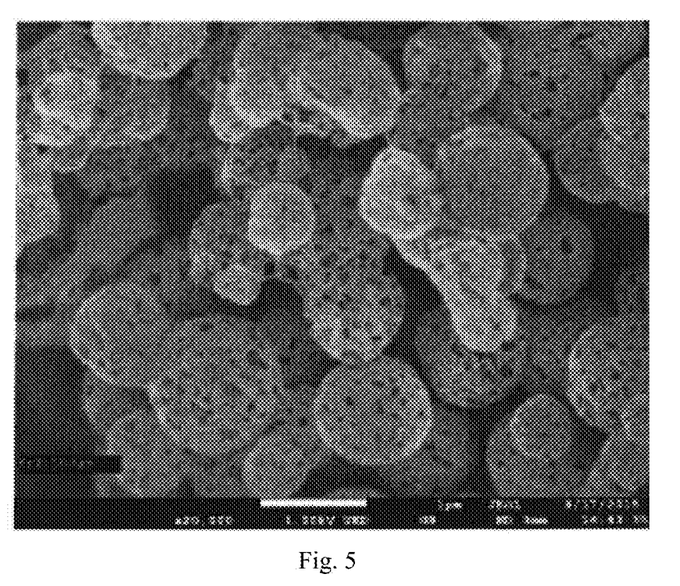
FIG. 5 shows a SEM micrograph of sulfur particles that are embedded with functionalized carbon black particles and prepared with a 3:1 mixture of sulfuric acid and nitric acid.

The acid may be selected from the group consisting of hydrochloric acid, oxalic acid, ascorbic acid, concentrated sulfuric acid, nitric acid, methanesulfonic acid and a mixture thereof. For example, a 3:1 mixture (based on the total volume of the acid mixture) of concentrated sulfuric acid and nitric acid may be used. The particles obtained according to the method described in example 2 and shown in FIGS. 4 and 5 provide a sulfur cathodic material with very high sulfur content (>95% can be routinely obtained) and thus addresses the need for higher sulfur content to obtain increased energy density.

A soluble precursor of at least one of selenium and tellurium is of a formula (I):

$$Na_2SSe_mTe_nO_3 \quad (I)$$

where m and n range from 0 to 1, and a sum of m and n is 1.

For example, a soluble precursor for selenium may be $Na_2SSeO_3$. The soluble precursor of formula (I) may be prepared by refluxing sodium sulfite with elemental selenium and/or elemental tellurium in water. Treating the soluble precursor of selenium and/or tellurium with an acid, in a reaction similar to equation (a), may form a core comprising sulfur, selenium and/or tellurium.

The disclosure is not limited to the particular chemistry described and any method to form and precipitate chalcogen elements in the presence of polymers which contain hydrophobic and hydrophilic domains may be employed. The structure of the polymers governs the growth of hydrophobic sulfur near the hydrophobic domains. For example, the polymer backbone rearranges in the hydrophilic medium (usually aqueous solutions) to form enclosed structures, such as spheres/cubes, rhomboids, hexagons and etc., which encapsulates elemental sulfur.

An example of a polymer having hydrophobic and hydrophilic domains is a polymer salt of poly(3,4-ethylenedioxythiophene) (PEDOT) and polystyrene sulfonate (PSS). Other non-limiting examples of such polymers include poly(3,4-ethylenedioxythiophene) polystyrene sulfonate (PEDOT:PSS), polyvinylpyrrolidone (PVP), polyaniline (PANI), poly(ethylene oxide) (PEO), carboxymethyl cellulose (CMC), sodium carboxymethylcellulose (NaCMC), polymethacrylic acid (PMA), [poly(2-acrylamido-2-methyl-1-propanesulfonic acid)] (PAMPA), branched polyethylenimine (bPEI), and poly(diallyldimethylammoniumchloride) (PDAD).

In a further embodiment, the present disclosure provides an electrode, preferably a cathode containing the particles. The cathode may be prepared by mixing the particles according to the above description with one or more binders and other materials conventionally employed to prepare a cathode structure. These materials may be mixed as a slurry, coated onto a metal foil, and dried. The methods of construction of a cathode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The cathode thus prepared may be employed in the construction of an electrochemical cell or battery in a conventionally known manner. In a preferred embodiment the cathode may be combined with an anode having lithium as an active material.

Thus, the present disclosure provides a battery comprising a lithium anode and a cathode comprising the particles according to the present disclosure.

Nonaqueous solvents suitable as an electrolyte include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether.

The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

In further embodiments the present disclosure includes a vehicle containing the battery according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

Example 1 Functionalization of Conductive Carbon Black

Figure 1:
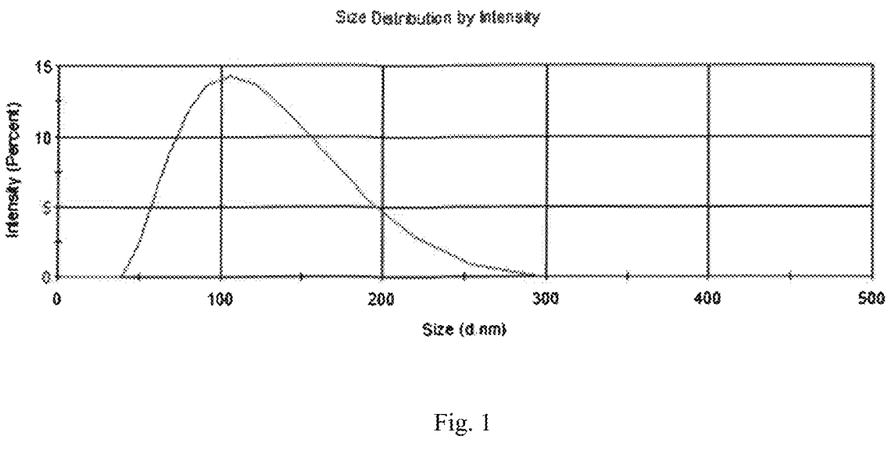
FIG. 1 shows a dynamic light scattering (DLS) plot of the size distribution of functionalized carbon black particles prepared with nitric acid, as shown in the Example.

Ketjen Black® (1.25 g, ECP600jd, LION) was added to a 1 L conical flask with distilled water and nitric acid (250 ml, $HNO_3$, 70%, Sigma-Aldrich). This acidic solution was stirred at 600 rpm for three days. During stirring, the temperature of the conical flask was heated up and maintained at 70° C. After three days, the acid-treated carbon was separated from the acidic solution by centrifugation at 12000 rpm for 1 minute. Caution should be taken during this procedure because of using reactive and corrosive acid. This treated carbon was rinsed with distilled water at least 5 times until the separation of carbon become difficult. The degree of functionalization of carbon in $H_2O$ was examined by Zeta potential (Zetasizer nano range, Malvern). The zeta potential of the functionalized carbon black particles showed −48 mV after the rinsing, and the number may correspond to the amount of carboxyl groups on carbon surface. The size of the functionalized carbon black particles in $H_2O$ was determined by dynamic light scattering (DLS, Zetasizer nano range, Malvern) and the size ranges from 40 nm to 300 nm (FIG. 1).

Figure 2:
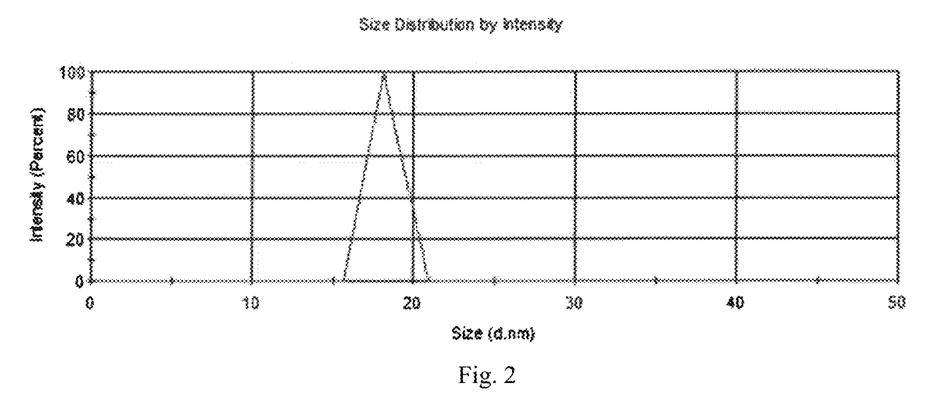
FIG. 2 shows a dynamic light scattering (DLS) plot of the size distribution of functionalized carbon black particles prepared with a 3:1 ratio of concentrated sulfuric acid to nitric acid.

A similar carbon treatment can be performed by mixing 1 g of Ketjen Black® EPC600jd with a 3:1 mixture of concentrated $H_2SO_4$ and $HNO_3$ and refluxed at 70° C. for longer than 1 hour. DLS measurement of the treated carbon shows the particle size ranges from 20-40 nm (FIG. 2). Other similar acid treatments include methanesulfonic acid.

Figure 3:
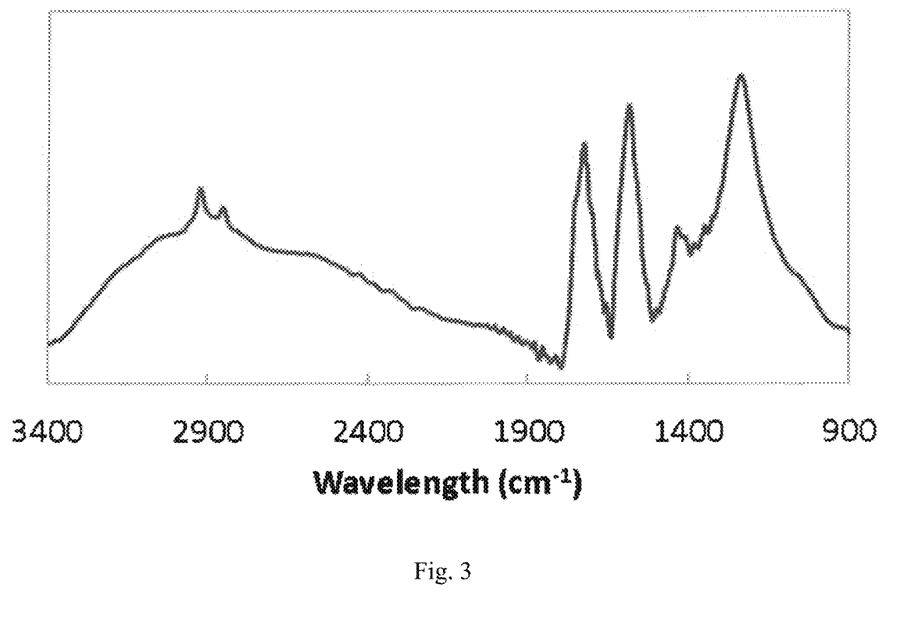
FIG. 3 shows an attenuated total reflectance Fourier transform infrared spectroscopy (ATR-FTIR) spectrum of functionalized carbon black particles, indicating the presence of the —COOH acidic functional group.

FIG. 3 shows the attenuated total reflectance Fourier transform infrared spectroscopy (ATR-FTIR) spectrum of the functionalized carbon black particles, indicating the presence of the —COOH acidic functional group.

Figure 6:
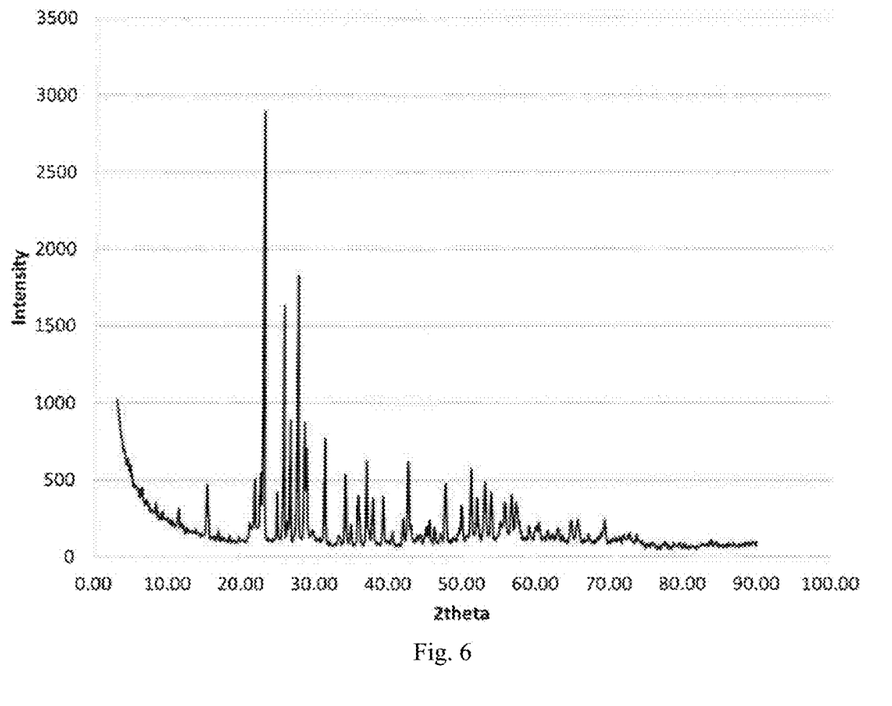
FIG. 6 shows a XRD spectrum of sulfur particles that are embedded with functionalized carbon black particles and prepared with a 3:1 mixture of sulfuric acid and nitric acid.
Figure 7:
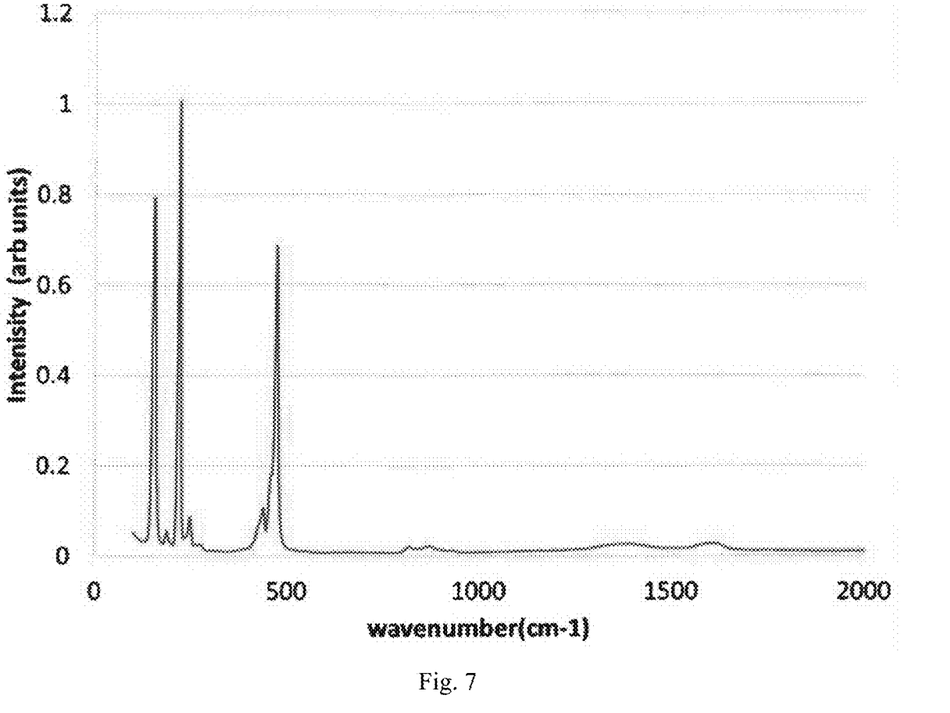
FIG. 7 shows a Raman spectrum of sulfur particles that are embedded with functionalized carbon black particles and prepared with a 3:1 mixture of sulfuric acid and nitric acid.

Example 2 Preparation of Polymer-Coated Sulfur Particles with Carbon Embedded in the Sulfur Core Sodium thiosulfate (1 g, 6.32 mmol, $Na_2S_2O_3$, 99%, Reagent Plus®, Sigma-Aldrich) was dissolved in distilled water (40 ml) in a 140 ml beaker. Poly(3,4-ethylenedioxythiophene)-poly(styrenesulfonate) (700 μL, PEDOT:PSS, 1.1% in $H_2O$, high conductive grade, Sigma-Aldrich) was added in the sodium thiosulfate solution and then stirred. Oxalic acid (3.41 g, 37.9 mmol, >99.0%, Sigma-Aldrich) was dissolved in distilled water (40 ml) in a 140 ml beaker. The mole ratio of sodium thiosulfate and oxalic acid was 1:6. The functionalized carbon particles (3 mg in 1 ml of distilled water) were dispersed in the oxalic acid solution. Ascorbic acid (6.68 g, 37.9 mmol, 99%, Sigma-Aldrich) could also be used for the synthesis instead of oxalic acid. This acidic solution was poured quickly into the sodium thiosulfate solution, and the solution color turned creamy gray. The solution was stirred rapidly at 900 rpm at room temperature. After the reaction had proceeded for 3 hours, this solution was sonicated for 5 minutes. The precipitated sulfur particles were separated from the acidic solution by centrifugation at 3000 rpm for 5 minutes. Then, the sulfur particles were rinsed by distilled water in a 50 ml centrifuge tube where the sulfur particles were vortexed at 3000 rpm for 30 seconds and centrifuged at the same condition as above. In order to remove the excess polymer on the particles, the rinsing process should be done thoroughly. This rinsing procedure was repeated 5 times. The size distribution of sulfur particles was determined by DLS. Shapes of sulfur particles were observed by a scanning electron microscope (SEM, JEOL) and shown in FIG. 4. The sulfur particle can also be synthesized in the presence of numerous polymers including PVP, PANI, PEO, CMC, NaCMC. Similar syntheses can be obtained with acids such as HCl, a 3:1 mixture of concentrated $H_2SO_4$ and $HNO_3$ (60 ml needs to be added to the procedure described above) and methanesulfonic acid (700 ml needs to be added to the procedure described above). FIG. 5 shows the polymer-coated sulfur particles prepared with the 3:1 mixture of concentrated $H_2SO_4$ and $HNO_3$ are mostly spheres and spheroids with diameters ranging from 1-5 FIG. 6 is an XRD spectrum of the polymer-coated sulfur particles prepared with the 3:1 mixture of concentrated $H_2SO_4$ and $HNO_3$, indicating crystalline sulfur is present. FIG. 7 is a Raman spectrum of the polymer-coated sulfur particles prepared with the 3:1 mixture of concentrated $H_2SO_4$ and $HNO_3$. The absorption peaks correspond to the fundamental vibrations of sulfur.

Example 3 Preparation of Polymer-Coated Particles Comprising Sulfur and Selenium with Functionalized Conductive Carbon Black Embedded in the Chalcogen Core Selenium (1.2 g) was refluxed (brought to a brief boil then lowered temperature) with sodium sulfite (12 g) in 65 ml water to form $NaSeSO_3$. Ascorbic acid (31 g) was dissolved in 140 ml water. Polymethacrylic acid (19.5 ml) and functionalized conductive carbon black (3 mg in 1 ml of distilled water), which was dissolved in an acid of choice, were mixed with the ascorbic acid solution. The resultant solution was diluted to 265 ml and mixed with the boiled solution containing $NaSeSO_3$. The solution had a pH of 5.1 and a color of dark garnet. The solution was stirred for 24 hours during which it turned milky garnet in color.

Similar results can be obtained if oxalic acid, HCl or a 3:1 mixture of $H_2SO_4$ and $HNO_3$ are used as acids instead of ascorbic acid. The reaction pH needs to be maintained between 4 and 6. Other polymers can be used instead of polymethacrylic acid (PMA), such as poly(2-acrylamido-2-methyl-1-propanesulfonic acid) (PAMPS), branched polyethylene imine (bPEI), poly(3,4-ethylenedioxythiophene) polystyrene sulfonate (PEDOT:PSS) or poly(diallyldimethylammonium chloride) (PDAD).

Figure 8:
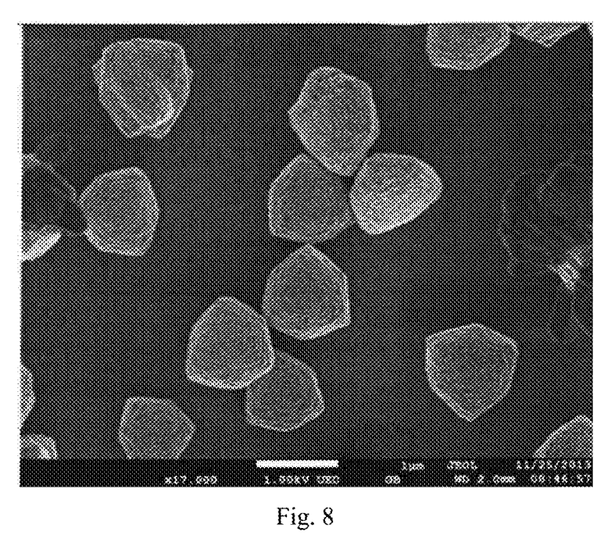
FIG. 8 shows a SEM micrograph of particles comprising sulfur and selenium, embedded with functionalized carbon black particles and prepared with ascorbic acid, as shown in the Example.
Figure 9:
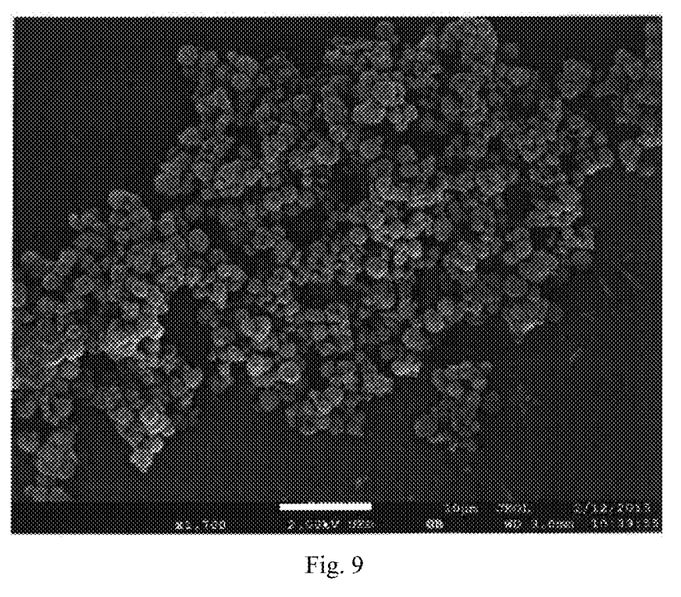
FIG. 9 shows a SEM micrograph of particles comprising sulfur and selenium, embedded with functionalized carbon black particles and prepared with a 3:1 mixture of sulfuric acid and nitric acid.

FIG. 8 shows the polymer-coated particles prepared with ascorbic acid are mostly irregular hexagons diameters ranging from 0.5-1.5 μm. FIG. 9 shows the polymer-coated particles prepared with the 3:1 mixture of concentrated $H_2SO_4$ and $HNO_3$ are mostly spheres and spheroids with diameters ranging from 1-3 μm.

The invention claimed is:
1. An electrode active material, comprising:
a core particle of at least one element selected from the group consisting of sulfur, selenium and tellurium; and
a coating of at least one polymeric layer encapsulating the core particle;
wherein the core particle comprises particles of a functionalized conductive carbon material which are homogenously dispersed throughout the at least one element of the core particle,
wherein an amount of the functionalized conductive carbon material homogenously dispersed throughout the at least one element of the core particle is from 1.0 to 15% by weight of a total weight of the core particle, the functionalized conductive carbon material comprises carboxyl groups on at least a surface of the particle of the functionalized conductive carbon material, and a Zeta potential of the functionalized conductive carbon material ranges from −20 mV to −60 mV when measured in distilled water.

2. The electrode active material of claim 1, wherein an amount of the functionalized conductive carbon material homogenously dispersed throughout the at least one element of the core particle is from 1.0 to 10% by weight of a total weight of the core particle.

3. The electrode active material of claim 1, wherein a particle size of the functionalized conductive carbon material particle is from 25 nm to 500 nm.

4. The electrode active material of claim 1, wherein a BET surface area of the functionalized conductive carbon material particle is from 1000 to 1600 $m^2/g$.

5. The electrode active material of claim 1, wherein the coating comprises a layer of at least one polymer selected from the group consisting of poly(3,4-ethylenedioxythiophene) polystyrene sulfonate, polyvinylpyrrolidone, polyaniline, poly(ethylene oxide), carboxymethyl cellulose, sodium carboxymethylcellulose, polymethacrylic acid, [poly(2-acrylamido-2-methyl-1-propanesulfonic acid)], branched polyethylenimine, and poly(diallyldimethylammoniumchloride).

6. The electrode active material of claim 1, wherein the functionalized conductive carbon material is COOH functionalized superconductive carbon black.

7. A method for preparing an electrode active material, comprising:
a core particle of at least one element selected from the group consisting of sulfur, selenium and tellurium; and
a coating of at least one polymeric layer encapsulating the core particle;
wherein the core particle comprises particles of a functionalized conductive carbon material which are homogenously dispersed throughout the at least one element of the core particle;
the method comprising:
mixing an aqueous solution of a polymer with an aqueous solution of a soluble precursor of at least one element selected from the group consisting of sulfur, selenium and tellurium to form a first mixture;
mixing an acid with the particles of functionalized conductive carbon material to form a second mixture; and
adding the second mixture to the first mixture to obtain the electrode active material.

8. The method of claim 7, wherein the soluble precursor of sulfur is sodium thiosulfate.

9. The method of claim 7, wherein an amount of the functionalized conductive carbon material particles is from 1.0 to 15% by weight of a total weight of the core particle.

10. The method of claim 7, wherein a Zeta potential of the functionalized conductive carbon material particle is from −20 mV to −60 mV when measured in distilled water.

11. The method of claim 7, wherein the functionalized conductive carbon material comprises carboxyl groups on at least a surface of the functionalized conductive carbon material particle.

12. The method of claim 7, wherein a particle size of the functionalized conductive carbon material particle is from 25 nm to 500 nm.

13. The method of claim 7, wherein a BET surface area of the functionalized conductive carbon material particle is from 1000 to 1600 $m^2/g$.

14. The method of claim 7, wherein the acid is at least one selected from the group consisting of hydrochloric acid, oxalic acid, ascorbic acid, concentrated sulfuric acid, nitric acid, methanesulfonic acid and a mixture thereof.

15. The method of claim 7, wherein the polymer is at least one polymer selected from the group consisting of poly(3,4-ethylenedioxythiophene) polystyrene sulfonate, polyvinylpyrrolidone, polyaniline, poly(ethylene oxide), carboxymethyl cellulose, sodium carboxymethylcellulose, polymethacrylic acid, [poly(2-acrylamido-2-methyl-1-propanesulfonic acid)], branched polyethylenimine, and poly(diallyldimethylammoniumchloride).

16. A cathode comprising:
a conductive substrate, and
the electrode active material of claim 1.

17. A battery, comprising:
an anode comprising a metal as an active source of metal ions, and
the cathode of claim 16.

18. A vehicle, comprising the battery of claim 17.

* * * * *